United States Patent
Hacigumus et al.

(10) Patent No.: US 8,271,428 B2
(45) Date of Patent: Sep. 18, 2012

(54) METHOD AND SYSTEM FOR CREATING AND LOADING DATA WAREHOUSE FROM SEMI-STRUCTURED DOCUMENT

(75) Inventors: Vahit Hakan Hacigumus, San Jose, CA (US); Jeffrey Thomas Kreulen, San Jose, CA (US); James J. Rhodes, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1727 days.

(21) Appl. No.: 10/850,703

(22) Filed: May 20, 2004

(65) Prior Publication Data

US 2005/0262129 A1    Nov. 24, 2005

(51) Int. Cl.
*G06F 17/00* (2006.01)
(52) U.S. Cl. ...................................................... 707/602
(58) Field of Classification Search .................. 707/600, 707/602, 639
See application file for complete search history.

(56) References Cited

U.S. PATENT DOCUMENTS

| | | | | |
|---|---|---|---|---|
| 6,014,670 | A | 1/2000 | Zamanian et al. | 707/101 |
| 6,167,405 | A | 12/2000 | Rosensteel, Jr. et al. | 707/102 |
| 6,212,524 | B1 * | 4/2001 | Weissman et al. | 707/600 |
| 6,446,061 | B1 | 9/2002 | Doerre et al. | 707/3 |
| 6,490,590 | B1 * | 12/2002 | Fink | 707/602 |
| 6,622,152 | B1 | 9/2003 | Sinn et al. | 707/204 |
| 2003/0187862 | A1 | 10/2003 | Brobst | 707/102 |
| 2004/0236786 | A1 * | 11/2004 | Medicke et al. | 707/104.1 |
| 2006/0173926 | A1 * | 8/2006 | Kornelson et al. | 707/200 |

FOREIGN PATENT DOCUMENTS

JP    8115341 A    4/1996

OTHER PUBLICATIONS

Hummer, Wolfgang; Bauer, Andreas; Harde, Gunnar, "Xcube—XML for Data Warehouse", DOLAP'03, Nov. 7, 2003 pp. 33-40.
Kotsakis, Evangelos "Structured Information Retrieval in XML Documents", 2002 ACM I-58113-445—Feb. 2, 2003 pp. 663-667.
Rifaieh, Rami; Benharkat, Nabila Aicha, "Query-based Data Warehouse Tool", DOLAP'02, Nov. 8, 2002 pp. 35-42.
Jian-Fen, Wang; Yuan-da, Cao, "Uniform Representation Model for Metadata of Data Warehouse", Journal of Beiging Institute of Technology, Mar. 2002 vol. 11, No. 1 pp. 85-88.

* cited by examiner

*Primary Examiner* — Belix M Ortiz Ditren
(74) *Attorney, Agent, or Firm* — John L. Rogitz

(57) ABSTRACT

A data warehouse is created using an input file that can contain sub-documents of different formats. A root document model including path names to all nodes among the sub-documents is generated, and a table is generated with columns being derived from the path names of the root model. The sub-documents are shredded to populate the table. Then, the dimensions of the data warehouse are defined by selecting respective columns. A routine such as a DDL may then be generated to populate the data warehouse with data.

36 Claims, 2 Drawing Sheets

GUI

METHOD AND SYSTEM FOR CREATING AND LOADING DATA WAREHOUSE FROM SEMI-STRUCTURED DOCUMENT

BACKGROUND OF THE INVENTION

1. Field of the Invention

The present invention relates to creating and loading data warehouses from a semi-structured document.

2. Description of the Related Art

A data warehouse can contain data from documents that include a vast quantity of structured data. When a user wants to create and load a data warehouse, the user accesses an initial set of data in a structured format, e.g., XML. Often, a single XML file is actually a collection of several individual documents containing the data which a user must process and store. For example, a single XML file might contain all of the patents filed in 1994. Within this XML document might be sub documents that represent the patents themselves.

As recognized herein, an XML file ordinarily is accompanied by an XML Schema file or a DTD file explaining the XML structure. While this is beneficial data to have, many times these files are missing. Even with a Schema or DTD file, it is not a simple task to create and load a data warehouse having, e.g., a star schema. There are no tools that integrate creating a schema and "shredding" documents, i.e., populate the schema with data in the documents. This is especially true without a DTD or an XML Schema.

Current solutions to the above problem of loading a data warehouse with documents when the structure of the documents might not be known are to create a new data type for XML and allow users to execute XQuery (or something like XQuery) over that data type. As understood herein, this has performance drawbacks particularly when, instead of many small files, a large file must be loaded into the data warehouse. For example, in the case of a single large XML file containing all the issued patents in a given year and thus containing data on which the user might want to operate, e.g., by using an online analytical processing (OLAP) tool, the above-summarized native data type approach is not sufficient.

Another problem that arises from working with semi-structured files like XML is that two files about the same subject might contain a somewhat different structure. Typically this is handled by reformatting the files to create a standard format. However, this plainly entails effort on the part of the user and, hence, is less than optimum.

Accordingly, as understood herein it would be beneficial to provide a user with the ability to create a data warehouse schema, build the needed tables and load those tables into a data warehouse from one or more XML documents of any size where the structure of the given files may or may not be known in advance. It would be desirable to accomplish this in relatively few, relatively simple steps without requiring excessive reading of the XML files.

SUMMARY OF THE INVENTION

One aspect of the invention is a general purpose computer according to the inventive steps herein. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein. The invention is also a computer-implemented method for undertaking the acts disclosed below. Also, the invention may be embodied as a service.

Accordingly, a computer-implemented method is disclosed for creating a data warehouse from at least one semi-structured file. The method includes analyzing the file to generate at least one generic schema, and creating at least one database table using the schema. The method also includes loading data in the file into corresponding columns in the table and then defining dimensions for a data warehouse using columns of the table. At least two files may be used if desired that differ from another in at least one of: structure, format, and semantics.

In another aspect, a service for creating a data warehouse for a customer includes generating a root model of at least one sub-document in at least one input file and then using the root model to generate at least one table. The service also includes shredding sub-documents to populate the table, and using columns in the table to define dimensions of the data warehouse. At least one of: the data warehouse, and a routine to populate the data warehouse with data from the input file, are provided to a customer.

The non-limiting root model at least in part includes path names to nodes in at least one document as well as maximum node value sizes. Each column of the exemplary non-limiting table represents a path name to a node of the root model containing data, and each row of the table represents a sub-document in the input file. The root model can be generated by merging a model of a first sub-document with a model of a second sub-document. Each document may be shredded to populate the table with values. Specifically, a model populated with a sub-document's values can be created and read, and values inserted into the table from the sub-document's model such that the table is populated with the data in the sub-documents.

In yet another aspect, a computer executes logic that includes generating a root model of plural documents, with the root model including path names to all nodes among the documents. The logic also includes generating a table having columns or rows derived from the path names of the root model, and defining plural dimensions of a data warehouse by selecting respective columns, or respective rows, of the table.

In still another aspect, a computer program product has means executable by a digital processing apparatus to create a data warehouse for storing data in an input file. The computer program product includes means for generating a root document model containing path names to all nodes in the input file, and means for using the path names to establish dimensions in the data warehouse.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
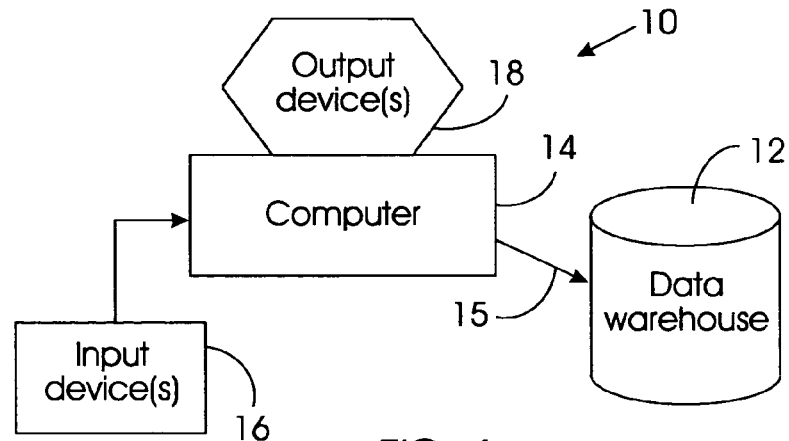
FIG. 1 is a block diagram of the present system architecture.

Referring initially to FIG. 1, a system is shown, generally designated 10, that can include one or more data warehouses 12 that are created and populated in accordance with the disclosure below. A computer 14 for executing the present logic accesses the data warehouse 12 over a communication path 15. The path 15 can be the Internet, and it can be wired and/or wireless.

The computer 14 can include one or more input devices 16, such as a keyboard or mouse, for inputting data to the computer 14, as well as an output device 18, such as a monitor. The computer 14 can be a personal computer made by International Business Machines Corporation (IBM) of Armonk, N.Y. that can have, by way of non-limiting example, a 933 MHz Pentium® III processor with 512 MB of memory. Other digital processors, however, may be used, such as a laptop computer, mainframe computer, palmtop computer, personal assistant, or any other suitable processing apparatus such as but not limited to a Sun® Hotspot™ server. Likewise, other input devices, including keypads, trackballs, and voice recognition devices can be used, as can other output devices, such as printers, other computers or data storage devices, and computer networks.

In any case, the processor of the computer 14 executes certain of the logic of the present invention that may be implemented as computer-executable instructions which are stored in a data storage device with a computer readable medium, such as a computer diskette having a computer usable medium with code elements stored thereon. Or, the instructions may be stored on random access memory (RAM) of the computer 14, on a DASD array, or on magnetic tape, conventional hard disk drive, electronic read-only memory, optical storage device, or other appropriate data storage device. In an illustrative embodiment of the invention, the computer-executable instructions may be lines of C++ code or JAVA.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Figure 2:
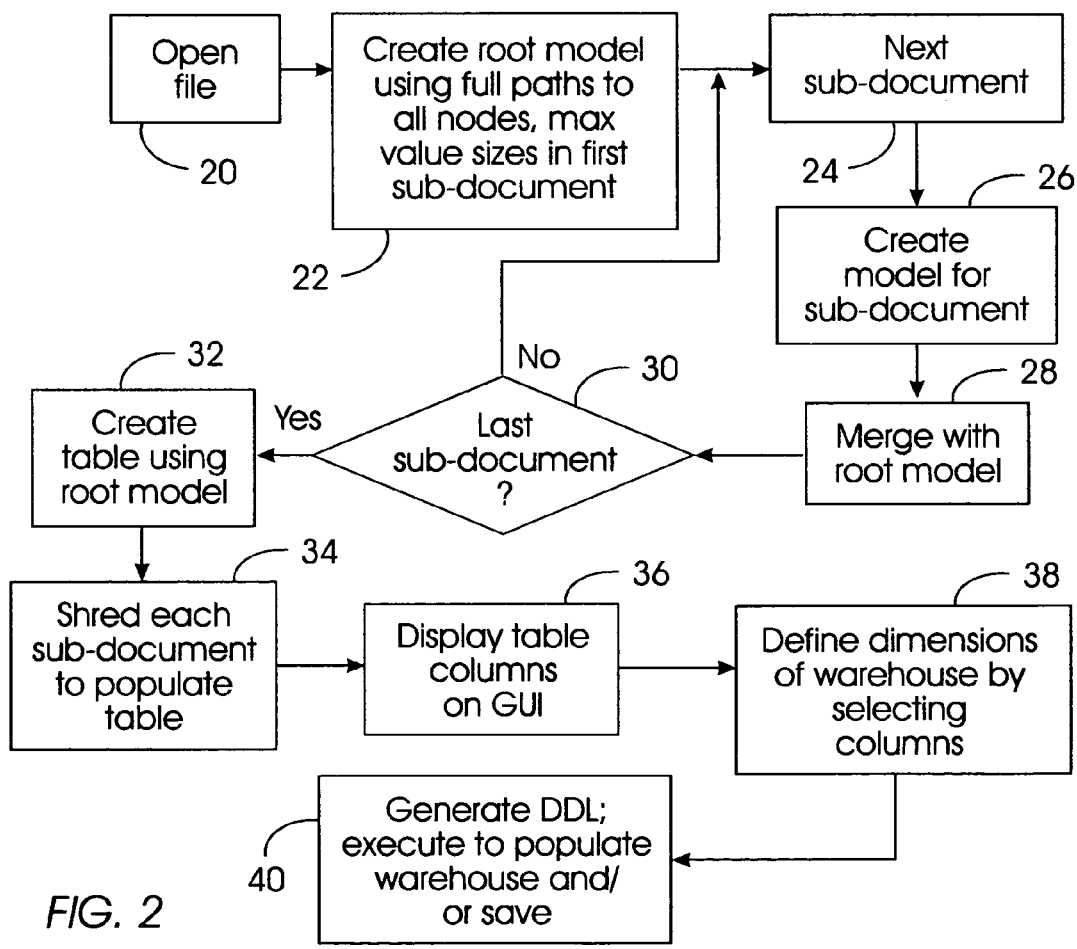
FIG. 2 is a flow chart of the logic.

Now referring to FIG. 2, commencing at block 20 a received input file, such as but not limited to an XML-formatted file, is opened to access sub-files (also referred to herein as "sub-documents", "files", or "documents"), e.g., patents, within the file. The file may be opened in one non-limiting example using a SAX parser or any other application that is capable of parsing an XML document in a streaming format. Moving to block 22, a root document model is created using a first sub-document. The root model contains a respective entry for the full path to each node in the sub-document that contains data. Nodes with the exact same path and name are combined into one entry. The model also maintains a record of the maximum size the value may be at any given node.

Proceeding to block 24, the next sub-document is retrieved from the input file, and a model created for this sub-document using the principles employed above for generating the initial root model. At block 28 the new model is merged with the root model to generate an updated root model. The merging step entails adding the path names of any new nodes in the new model to the root model, and not adding nodes with the exact same path and name as one already existing in the root model. It will be appreciated that the final root model is a generic model that contains all of the possible fields for all of the XML sub-documents. It will further be appreciated that the sub-files may differ from another in structure and/or format and/or semantics.

Decision diamond 30 indicates that the process of merging the root model with new models continues until all of the sub-documents have been parsed, as which point the logic moves to block 32 to create a table using the final root model. More specifically, a table is created in which each column represents the full path (such as an XML path) to all nodes containing data, and each row represents a sub-document in the input file. Initially all columns are variable characters (VARCHARS) or Binary Large Objects (BLOBS) depending on their maximum value.

Moving next to block 34, each sub-document is shredded to populate the table with values. This is done in one non-limiting implementation by using the same parser used to open the input file. For each sub-document, a model populated with the sub document's values is created. Since the table must contain all the possible node names, the sub-document's model can be read and the appropriate values inserted into the table from the model representing the sub-document. In this way, the table is populated with the data in the sub-documents.

Figure 3:
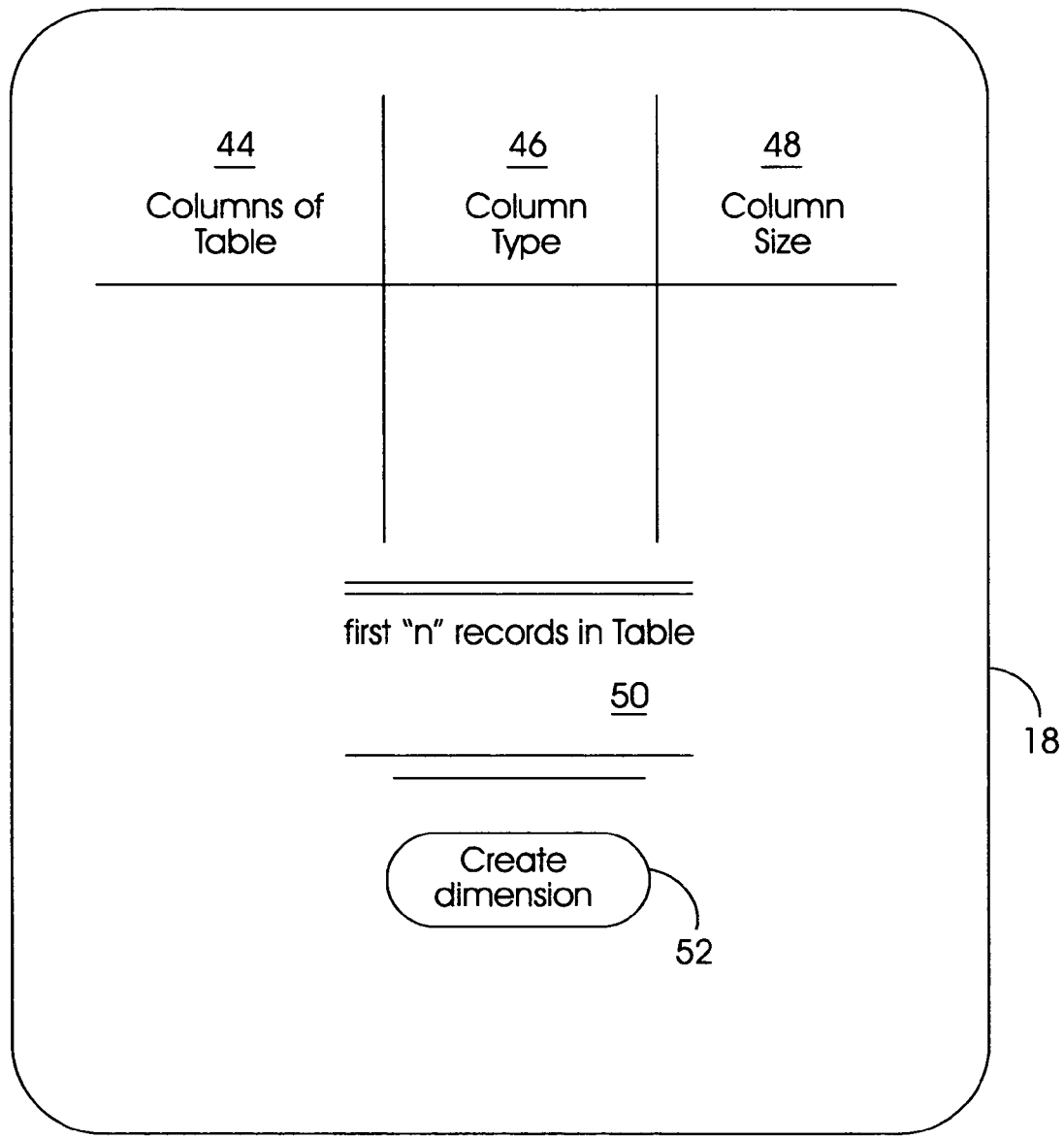
FIG. 3 is a schematic diagram of an exemplary graphic user interface (GUI).

Block 36 indicates that a graphical user interface (GUI), a preferred implementation of which is shown in FIG. 3 and discussed further below, is used to display the columns of the table, the column types, and the columns sizes. In addition the GUI may display, e.g., the first "x" records. Proceeding to block 38, warehouse dimensions can be defined using the GUI by allowing a user to select, for each dimension sought to be created, one or more table columns. In one non-limiting implementation, when a user defines a dimension by selecting the desired columns, the dimension name, column names, column types and column sizes are all stored in a hash table. In the hash table, the dimension name is the key while a vector or vectors containing the column name, type and size for each member of the dimension is the value. A user may also edit a dimension. Further, a user may create a column as a function performed on other columns in the raw table, and/or declare columns as being "none unique" when, e.g., a column is either a blob or a clob and it is not desired to use a "SELECT DISTINCT" command to load the table. An example of another function would be allowing the user to change the "WHERE" clause used in creating the fact table of the data warehouse. The fact table is essentially a list of all documents in the data warehouse, with each row representing a sub-document and with corresponding numerical values in each row indicating primary keys in other tables (representing respective data dimensions) that contain characteristics of the documents.

Once the user has completed defining the dimensions of the data warehouse using the GUI, a Data Definition Language (DDL) may be created at block 40. The DDL is a non-limiting example of a routine that loads the data warehouse. To create the routine, each element in the above-described dimensions hash table is retrieved. Because each key is a table name, the values of the keys are used as the table definition. While the table definitions are constructed, the individual table insert statements and the fact table creation and insert statements are also created, taking into account any functions added during the editing phase. The DDL is then displayed for the user. The user may depress a "generate" button on the GUI to automatically generate the DDL for immediate execution to populate the data warehouse and/or to save the DDL and execute it later. If desired, the dimension hash table can be saved to a file which will allow the user to apply the same dimension model to a different data set in the future.

Now referring to FIG. 3, an exemplary GUI, generally designated 42, is shown. As shown, the GUI 42, which may be displayed on the monitor 18 shown in FIG. 1, can include a table columns column 44, a column type column 46, and a column sizes column 48. In addition the GUI may display, e.g., the first "x" records 50. Moreover, the GUI 42 may include one or more buttons, such as a "create dimension" button 52 that the user can click to indicate that columns which have been selected by the user are to define a dimension.

Sample non-limiting illustrative code implementing the logic discussed above is set forth below.

```
Create Model Code:
{
  String fileName = args[1];
  XmlParser xp = new XmlParser( );
  XmlModelBuilder xmb = new XmlModelBuilder( );
  XMLReader xr = xmb.init(true,null);
  xr.setContentHandler(xmb);
  xr.setErrorHandler(xmb);
  try {
    FileReader r = new FileReader(fileName);
    xr.parse(new InputSource(r));
  } catch (IOException e) {
    e.printStackTrace( );
  } catch (SAXException e) {
    e.printStackTrace( );
  }
  Hashtable results = xp.formatModel(xmb.currentVals);
  xp.printModel(results);
  try {
    int x = fileName.lastIndexOf('/');
    if (x != −1)
      fileName = fileName.substring(x+ 1);
    ObjectOutputStream oos = new ObjectOutputStream(new FileOutputStream(ConfigFile.modelFile+"_"+fileName));
    oos.writeObject(results);
    oos.close( );
  } catch (Exception ex){
    ex.printStackTrace( );
  }
}
Load Model Code
{
  String fileName = args[1];
  XmlParser xp = new XmlParser( );
  try {
    ObjectInputStream ois = new ObjectInputStream(new FileInputStream(fileName));
    Hashtable xtn = (Hashtable)ois.readObject( );
    ois.close( );
    xtn = xp.formatModel(xtn);
    xp.printModel(xtn);
    String sql = xp.printRawSQL(xtn);
    XmlToDb2 xtd = new XmlToDb2(true);
    xtd.createTable(sql,ConfigFile.rawTableName);
    xtd.disConnect( );
    System.out.println("Finished!");
  } catch (Exception ex){
    ex.printStackTrace( );
  }
}
public String printRawSQL(Hashtable model){
    String line = "CREATE TABLE "+ConfigFile.rawTableName+" ( RAW_KEY "+ConfigFile.idString;
    Enumeration e = model.keys( );
    while (e.hasMoreElements( )){
        String name = (String)e.nextElement( );
        Integer value = (Integer)model.get(name);
        name = getName(name);
        name = name.toUpperCase( );
        columns.put(name,"N/A");
        colname.add(name);
        String type = determineDataType(value.intValue( ));
        if (type.indexOf("VARCHAR") != −1){
           types.put(name,"VARCHAR");
        } else {
           types.put(name,"CLOB");
        }
        line += ", "+name+" "+type;
    }
    line +=")NOT LOGGED INITIALLY DATA CAPTURE NONE IN"+ConfigFile.tsName;
    return line;
}
Load Database Code
{
```

```
XmlParser xp = new XmlParser( );
String inputFile = args[1];
XmlToDb2 xtd = new XmlToDb2(true);
int p = inputFile.lastIndexOf("/");
if (p == -1)
  xtd.badRecords = inputFile+"_BADRECS";
else {
  xtd.badRecords = inputFile.substring(p+1)+"_BADRECS";
}
String modelFileName = args[2];
try {
  ObjectInputStream ois = new ObjectInputStream(new FileInputStream(modelFileName));
  Hashtable xtn = (Hashtable)ois.readObject( );
  ois.close( );
  xtn = xp.formatModel(xtn);
  String sql = xp.printRawSQL(xtn);
  try {
    xtd.pw = new PrintWriter(new FileOutputStream(xtd.badRecords));
    xtd.pw.close( );
  } catch (FileNotFoundException e) {
    e.printStackTrace( );
  }
  xtd.prepStatement(xp);
  xtd.numTimes = 0;
  XmlModelBuilder xmb = new XmlModelBuilder( );
  xmb.xp = xp;
  XMLReader xr = xmb.init(false,xtd);
  xr.setContentHandler(xmb);
  xr.setErrorHandler(xmb);
  System.out.println("inputFile="+inputFile);
  try {
    FileReader r = new FileReader(inputFile);
    xr.parse(new InputSource(r));
  } catch (IOException e) {
    e.printStackTrace( );
  } catch (SAXException e) {
    e.printStackTrace( );
  }
  xtd.count = 0;
  xtd.pw.close( );
  xtd.lastExecuteHash(xp,xtd.records);
  xtd.commit( );
  System.out.println("Last Commit!");
  System.out.println("Finished!");
} catch (Exception ex){
  ex.printStackTrace( );
}
}
XML SAX Parser Code
package com.ibm.parser;
import java.util.Enumeration;
import java.util.GregorianCalendar;
import java.util.Hashtable;
import org.xml.sax.SAXException;
import org.xml.sax.XMLReader;
import org.xml.sax.Attributes;
import org.xml.sax.helpers.XMLReaderFactory;
import org.xml.sax.helpers.DefaultHandler;
import com.ibm.xml.ConfigFile;
import com.ibm.xml.XmlParser;
import com.ibm.xml.XmlToDb2;
import com.ibm.xml.XmlNode;
public class XmlModelBuilder extends DefaultHandler
{
  XmlNode xtn = null;
  public XmlParser xp = new XmlParser( );
  int count = 0;
  int numNodes = 0;
  boolean build = true;
  long startTime = 0;
  XmlToDb2 xtd = null;
  public Hashtable currentVals = new Hashtable( );
  public XMLReader init(boolean b,XmlToDb2 x){
    xtd = x;
    build = b;
    String configFile = System.getProperty("configFile");
    ConfigFile cf = new ConfigFile(configFile);
    cf.load( );
    System.setProperty("org.xml.sax.driver", "org.apache.xerces.parsers.SAXParser");
    XMLReader xr;
```

-continued

```
    try { // Piccolo
        xr = XMLReaderFactory.createXMLReader("com.bluecast.xml.Piccolo");
        System.out.println("Using Piccolo!");
    }catch (SAXException e1) {
      try { // Crimson
        xr = XMLReaderFactory.createXMLReader("org.apache.crimson.parser.XMLReaderImpl");
        System.out.println("Using Crimson!");
      }catch (SAXException e2) {
        try { // Ælfred
          xr = XMLReaderFactory.createXMLReader("gnu.xml.aelfred2.XmlReader");
        }catch (SAXException e3) {
          try { // Xerces
            xr = XMLReaderFactory.createXMLReader("org.apache.xerces.parsers.SAXParser");
            System.out.println("Using Xerces!");
          }catch (SAXException e4) {
            try { // Oracle
              xr = XMLReaderFactory.createXMLReader("oracle.xml.parser.v2.SAXParser");
            }catch (SAXException e5) {
              try { // default
                xr = XMLReaderFactory.createXMLReader( );
              }catch (SAXException e6) {
                throw new NoClassDefFoundError("No SAX parser is available");
              }
            }
          }
        }
      }
    }
    startTime = (new GregorianCalendar( )).getTime( ).getTime( );
    return xr;
  }
  public XmlModelBuilder( )
  {
      super( );
  }
  //////////////////////////////////////////////////////////
  // Event handlers.
  //////////////////////////////////////////////////////////
  public void startDocument ( )
  {
      if (xtd != null)
          xtd.turnOffLogging( );
      System.out.println("Start document");
      xtn = new XmlNode("ROOT",null,null);
      xtn.fullPath.append("ROOT");
  }
  public void endDocument ( )
  {
      System.out.println("End document");
  }
  public void startElement (String uri, String name,
          String qName, Attributes atts)
  {
    numNodes++;
    StringBuffer sb = new StringBuffer(qName);
    qName = sb.toString( );
    if (numNodes > 1){
        XmlNode newXtn = xtn.getChildByName(qName);
        if (newXtn == null){
           newXtn = new XmlNode(qName,null,null,xtn);
           newXtn.fullPath.append(xtn.fullPath+"_"+qName);
           xtn.addChild(newXtn);
        }
        xtn = newXtn;
    }
  }
  public void buildTree( ){
      count++;
      xtn = new XmlNode("ROOT",null,null);
      xtn.fullPath.append("ROOT");
      if (count == 5000){
        long endTime = (new GregorianCalendar( )).getTime( ).getTime( );
        double queryTime = (startTime-endTime)/1000;
        System.out.println("Load time="+queryTime+"s");
```

```
            startTime = (new GregorianCalendar( )).getTime( ).getTime( );
            System.out.println("parsed 5000!");
            count = 0;
        }
    }
public void endElement (String uri, String name, String qName)
{
        if (qName.compareToIgnoreCase(ConfigFile.tag) == 0){
            if (build)
                buildTree( );
            else {
                addToDb( );
            }
        }
        if (xtn.parent != null)
            xtn = xtn.parent;
    }
    public void characters (char ch[], int start, int length)
    {
    StringBuffer sb = new StringBuffer( );
    for (int i = start; i < start + length; i++) {
        sb.append(ch[i]);
        }
        if (sb.length( ) > 0){
            if (xtn.maxValueSize > 0)
                xtn.value.append(" | "+sb);
            else {
                xtn.value.append(sb);
            }
            xtn.maxValueSize = xtn.value.length( );
            if (build){
                Integer val = (Integer)currentVals.get(xtn.fullPath.toString( ));
                if (val == null){
                    currentVals.put(xtn.fullPath.toString( ),new
Integer(xtn.maxValueSize));
                } else if (val.intValue( ) < xtn.maxValueSize){
                    currentVals.put(xtn.fullPath.toString( ),new
Integer(xtn.maxValueSize));
                }
            } else {
                currentVals.put(xtn.fullPath.toString( ),new StringBuffer(xtn.value.toString( )));
            }
        }
    }
    public void addToDb( ){
        xp.resetColumns( );
        currentVals = xp.formatValues(currentVals);
        xtd.insertStatement(xp,currentVals);
        if (xtd.count == 499) {
            xtd.count = 0;
            xtd.commit( );
            long endTime = (new GregorianCalendar( )).getTime( ).getTime( );
            double queryTime = (startTime−endTime)/1000;
            System.out.println("Load time="+queryTime+"s");
            startTime = (new GregorianCalendar( )).getTime( ).getTime( );
            System.out.println("500 More!");
            xtd.turnOffLogging( );
            //System.exit(0);
        }
        xtn = new XmlNode("ROOT",null,null);
        xtn.fullPath.append("ROOT");
        currentVals.clear( );
    }
    public void skippedEntity(String name) throws SAXException{
    }
    public void printHashTable( ){
        Enumeration e = currentVals.keys( );
        while (e.hasMoreElements( )){
            String name = (String)e.nextElement( );
            Integer i = (Integer)currentVals.get(name);
            if (i.intValue( ) != 0)
                System.out.println(name.toString( )+" Max Size ="+i.intValue( ));
        }
    }
}
```

While the particular METHOD AND SYSTEM FOR CREATING AND LOADING DATA WAREHOUSE FROM SEMI-STRUCTURED DOCUMENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A computer-implemented method for creating a data warehouse from at least one semi-structured file, comprising:
   analyzing said at least one file to generate at least one generic schema;
   creating at least one database table using the schema;
   loading data in said at least one file into corresponding columns in the table; and
   defining dimensions for the data warehouse using columns of the table.

2. The method of claim 1, further comprising generating a routine to load data into the warehouse.

3. The method of claim 2, further comprising executing the routine to load data into the warehouse.

4. The method of claim 2, further comprising saving the routine.

5. The method of claim 2, comprising using an interface for at least one use selected from the group consisting of: saving, and executing, the routine.

6. The method of claim 1, comprising using, to generate the schema, at least two files that differ from another in at least one way selected from the group consisting of: structure, format, and semantics.

7. The method of claim 1, wherein the table is created automatically.

8. A service for creating a data warehouse for a customer, comprising:
   generating a root model of at least one sub-document in at least one input file;
   using the root model to generate at least one table;
   shredding sub-documents to populate the table;
   using columns in the table to define dimensions of the data warehouse; and
   providing at least one item selected from the group consisting of: the data warehouse, and a tool to populate the data warehouse with data from the input file, to the customer.

9. The service of claim 8, wherein the root model at least in part includes path names to nodes in at least one document.

10. The service of claim 9, wherein the root model at least in part includes maximum node value sizes.

11. The service of claim 8, wherein each column of the table represents a path name to all nodes of the root model containing data, and each row of the table represents a sub-document in the input file.

12. The service of claim 8, wherein the root model is generated at least in part by merging a model of a first sub-document with a model of a second sub-document.

13. The service of claim 8, wherein each sub-document is shredded to populate the table with values.

14. The service of claim 13, comprising:
   creating a model populated with a sub-document's values;
   reading the sub-document's model; and
   inserting values into a table from the sub-document's model to populate the table with the data in the sub-documents.

15. The service of claim 8, comprising displaying columns of the table, column types, and columns sizes using a graphical user interface (GUI).

16. The service of claim 15, wherein the GUI displays at least a predetermined integer number "x" records from the input file.

17. The service of claim 8, wherein in response to a dimension being defined by selecting at least one column from the table, the selected columns, dimension name, column names, column types and column sizes are stored in a hash table having the dimension name as a key and at least one vector containing the column name, type and size as the value.

18. A computer executing logic comprising:
   generating a root model of plural documents, the root model including at least path names to all nodes among the documents;
   generating a table having at least one structure selected from the group of structures consisting of columns, and rows, derived from the path names of the root model; and
   defining plural dimensions of a data warehouse by selecting at least one structure selected from the group of structures consisting of: respective columns, and respective rows, of the table.

19. The computer of claim 18, wherein the logic further comprises:
   shredding at least some documents to populate the table; and
   generating a routine to populate the data warehouse with data.

20. The computer of claim 18, wherein the root model at least in part includes maximum node value sizes.

21. The computer of claim 18, wherein each column of the table represents a path name to all nodes of the root model containing data, and each tow of the table represents a sub-document in the input file.

22. The computer of claim 18, wherein the root model is generated at least in part by merging a model of a first document with a model of a second document.

23. The computer of claim 18, wherein the logic includes:
   creating a model populated with a document's values;
   reading the document's model; and
   inserting values into the table from the sub-document's model to populate the table with the data in the sub-documents.

24. The computer of claim 18, wherein the logic comprises displaying columns of the table, column types, and columns sizes using a graphical user interface (GUI).

25. The computer of claim 24, wherein the GUI displays at least a predetermined integer number "x" records from an input file.

26. The computer of claim 18, wherein in response to a dimension being defined by selecting at least one column from the table, the selected columns, dimension name, column names, column types and column sizes are stored in a hash table having the dimension name as a key and at least one vector containing the column name, type and size as the value.

27. A computer program product having a program executable by a digital processing apparatus to create a data warehouse for storing data in an input file, comprising:

means for generating a root document model containing path names to all nodes in the input file; and means for using the path names to establish dimensions in the data warehouse.

28. The computer program product of claim 27, wherein the means for using includes:

means for generating a table having at least one structure selected from the group of structures consisting of columns, and rows, derived from the path names of the root model; and means for defining plural dimensions of a data warehouse by selecting at least one structure selected from the group of structures consisting of: respective columns, and respective rows, of the table.

29. The computer program product of claim 28, further comprising:

means for shredding at least some documents to populate the table; and means for generating a routine to populate the data warehouse with data.

30. The computer program product of claim 28, wherein the root model at least in part includes maximum node value sizes.

31. The computer program product of claim 28, wherein each column of the table represents a path name to all nodes of the root model containing data, and each row of the table represents a sub-document in the input file.

32. The computer program product of claim 28, wherein the root model is generated at least in part by merging a model of a first document with a model of a second document.

33. The computer program product of claim 28, comprising:

means for creating a model populated with a document's values;

means for reading the document's model; and means for inserting values into the table from the sub-document's model to populate the table with the data in the sub-documents.

34. The computer program product of claim 28, comprising GUI means for displaying columns of the table, column types, and columns sizes.

35. The computer program product of claim 34, wherein the GUI means displays at least a predetermined integer number "x" records from an input file.

36. The computer program product of claim 28, wherein in response to a dimension being defined by selecting at least one column from the table, the selected columns, dimension name, column names, column types and column sizes are stored in a hash table having the dimension name as a key and at least one vector containing the column name, type and size as the value.

\* \* \* \* \*